(12) United States Patent
Kurase

(10) Patent No.: US 7,755,673 B2
(45) Date of Patent: Jul. 13, 2010

(54) AUDIO FILE DELETING METHOD, APPARATUS AND PROGRAM AND CAMERA WITH AUDIO REPRODUCING FUNCTION

(75) Inventor: Hiroyuki Kurase, Asaka (JP)

(73) Assignee: FujiFilm Corporation, Tokyo (JP)

( * ) Notice: Subject to any disclaimer, the term of this patent is extended or adjusted under 35 U.S.C. 154(b) by 1033 days.

(21) Appl. No.: 09/994,747

(22) Filed: Nov. 28, 2001

(65) Prior Publication Data
US 2002/0063783 A1 May 30, 2002

(30) Foreign Application Priority Data
Nov. 28, 2000 (JP) .............................. 2000-360872

(51) Int. Cl.
H04N 5/76 (2006.01)
(52) U.S. Cl. .............. 348/231.1; 348/231.4; 348/231.9; 396/434
(58) Field of Classification Search .............. 348/231.1, 348/231.4, 231.9; 396/434
See application file for complete search history.

(56) References Cited
U.S. PATENT DOCUMENTS
5,130,812 A * 7/1992 Yamaoka ..................... 386/101

6,504,575 B1 * 1/2003 Ramirez et al. ........ 348/333.02
6,538,692 B2 * 3/2003 Niwa ....................... 348/231.1
6,810,441 B1 * 10/2004 Habuto et al. ................. 710/20
2002/0027602 A1 * 3/2002 Ejima et al. ................. 348/232

FOREIGN PATENT DOCUMENTS
JP          11-260090          9/1999

* cited by examiner

Primary Examiner—Yogesh K Aggarwal
(74) Attorney, Agent, or Firm—Birch, Stewart, Kolasch & Birch, LLP

(57) ABSTRACT

In the method of properly deleting music data in a music player or other equipment with audio reproduction function, and a camera with audio reproduction function, unnecessary audio file can be exactly deleted to keep a recording area of image data during image-capturing. The camera is a digital camera for recording electronic image data picked up via a CCD in a memory card. This camera contains an audio decoder circuit that can reproduce a music file stored in the memory card and can output audio from a speaker or a head phone. When the music file is deleted, a part of the file is reproduced to prompt an operator to make a confirmation. Also, when the memory card becomes full in an image-capturing mode, the music file can be reproduced if a photographer depresses a shutter button, thereby prompting the operator to confirm deletion.

1 Claim, 15 Drawing Sheets

AUDIO FILE DELETING METHOD, APPARATUS AND PROGRAM AND CAMERA WITH AUDIO REPRODUCING FUNCTION

BACKGROUND OF THE INVENTION

1. Field of the Invention

The present invention relates to a file deletion method and apparatus for deleting a music file recorded in recording media such as a memory card, a computer program for performing the method, and a camera with audio reproduction function.

2. Description of the Related Art

An image captured with a digital camera is recorded in the recording media, including a flash memory card such as smart media or compact flash, or a small hard disk card called a micro-drive. The capacity of recording media has increased year after year, making it possible to record the image data as well as digital music data.

Further, some audio compression techniques such as MP3 (MPEG-1 Audio Layer-III), TwinVQ (Transform-Domain Weighted Interleave Vector Quantization) and WMA (Windows Median Audio) have enabled the long time recording for a lot of music. In the digital cameras, if an audio decode and encode circuit is contained, a function as a music player can be added. In recent years, a digital camera with MP3 audio reproduction function has been developed and put on the market.

In case of deleting a file within the recording media using a digital camera with the additional function as the music player, the image data can be confirmed on a liquid crystal display (LCD) screen of a display unit, but the music file has a drawback that a file name can not be displayed for confirmation unless its font is used in the digital camera.

Also, there is the possibility that the recording media may contain the image data and the music data together, but the music file has a considerably large data size, corresponding to the data amount as much as a plurality of sheets of image data, whereby the recording medium for recording the music file becomes a capacity full state (no remaining recordable capacity) immediately after image-capturing begins, bringing about the danger that the image-capturing function of camera itself may be impeded.

SUMMARY OF THE INVENTION

The present invention has been developed in view of the above-described circumstances, and has as its object the provision of a method, an apparatus and a program for deleting the music data correctly in a music player or other equipment with music reproduction function, and a camera with audio reproduction function for effecting the deletion method.

In order to attain the above-described object, the present invention is directed to a method of deleting an audio file employing an apparatus having a function of reproducing the audio file to be output as audio, including reproducing and outputting the audio file selected as a deletion object to allow the operator to confirm whether or not the deletion object is correct, before performing an operation of deleting the audio file from a recording medium in which the audio file is recorded.

According to the present invention, when the audio file is deleted by an apparatus that can reproduce the audio file, a part (opening or intermediate part) or all of the audio file is reproduced to allow the operator to confirm the content, whereby the deletion of the audio file can be correctly performed, while avoiding the deletion of the file by mistake.

The present invention is also directed to an audio file deletion apparatus including a reproduction processing device which reproduces an audio file from a recording medium in which the audio file is recorded, an audio output device which outputs the audio reproduced by the reproduction processing device audibly, an instruction input device which inputs an instruction of deleting the audio file, a file deletion device which deletes the audio file from the recording medium, and a control device, in which the control device controls to reproduce and output the audio file of deletion object via the reproduction processing device and the audio output device upon an instruction from the instruction input device, accepting an instruction of whether or not the deletion of audio file is permitted, and enabling the file deletion device to delete the audio file when an instruction of deletion is accepted, or stopping an operation of deleting the audio file when the instruction of deletion is not accepted.

The present invention is also directed to a program for enabling a computer to perform a reproduction processing function of reproducing an audio file from a recording medium in which the audio file is recorded, an audio output function of outputting the audio reproduced by the reproduction processing function audibly, an instruction input function of inputting an instruction of deleting the audio file, a file deletion function of deleting the audio file from the recording medium, and a control function of controlling to reproduce and output the audio file of deletion object via the reproduction processing function and the audio output function upon an instruction from the instruction input function, accepting an instruction of whether or not the deletion of audio file is permitted, and enabling the file deletion function to delete the audio file when an instruction of deletion is accepted, or stopping an operation of deleting the audio file when the instruction of deletion is not accepted.

The program (software) for enabling the computer to perform the audio file deletion function of the invention can be provided to the third party by means of a CD-ROM or a magnetic disk or other removable media, or distributed by the use of the communication line such as the Internet. A term "computer" contains not only a personal computer and a portable telephone terminal (PDA), but also a microcomputer incorporated into the digital camera or other electronic equipment.

The present invention is also directed to a camera with audio reproduction function including an image pick-up device which converts an optical image into an electrical signal, an image-capturing instructing device which instructs the start of taking a picture with the image pick-up device, a signal processing device which processes the image signal obtained by the image pick-up device to convert it into the image data, a recording device which records the image data obtained by the signal processing device on a recording medium, a reproduction processing device which reproduces an audio file recorded on the recording medium, an audio output device which outputs the audio reproduced by the reproduction processing device audibly, a device which detects an empty capacity of the recording medium, a device which grasps an estimated recording data amount of image acquired by an image-capturing operation using the image pick-up device, an instruction input which instructs whether the deletion of audio file is permitted or not, and a control device which controls to extract the audio file stored in the recording medium as a deletion object, when the empty capacity is less than the estimated recording data amount, performing deletion by the file deletion device under the condition that the deletion of extracted audio file is permitted, keeping a recording area of the recording medium, and performing an operation of recording the captured image on the recording medium.

A permission of executing deletion may be input by the user immediately before executing the deletion operation, or may be set up beforehand to admit the deletion. In the case where the image file and the audio file are recorded together in the same recording medium, the audio file may be selectively deleted to secure the recording area of image.

The control device may control to reproduce and output the audio file extracted as the deletion object via the reproduction processing device and the audio output device, and then accept an instruction of whether or not the deletion of audio file is permitted.

Also, the control device may control to enable the image-capturing operation even when the empty capacity is less than the estimated recording data amount, allowing the operator to choose the deletable audio file and delete the audio file, and performing a recording operation of image data.

If the audio file is recorded in the recording medium, the audio file may be deleted to secure the recording area of image. In this embodiment, the image-capturing operation is permitted not to miss an image-capturing chance, and after deleting the audio file, the captured image is recorded in the recording medium. A determination of whether or not there is any audio file recorded in the recording medium may be made before or after the image-capturing operation. Also, a plurality of audio files may be deleted to keep the recording area corresponding to the estimated recording data amount.

The control device may control to permit the image-capturing operation even when the empty capacity is less than the estimated recording data amount, deleting the music file of deletion object in accordance with a preset deletion order to keep a recording area, and performing a recording operation of image data.

For the audio files recorded in the recording medium, a priority of deletion is predetermined, and when it is required to keep the image recording area, one or more audio files are deleted in accordance with the priority. The order of deletion may be attached automatically by the camera, or set up by the operator at will. When the operator sets up the order of deletion, the deletion of the audio file may be permitted by setting.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Hereunder a preferred embodiment will be described in detail for a method for deleting the music file and a camera with audio reproduction function according to preferred embodiments of the present invention in accordance with the accompanying drawings.

Figure 1:
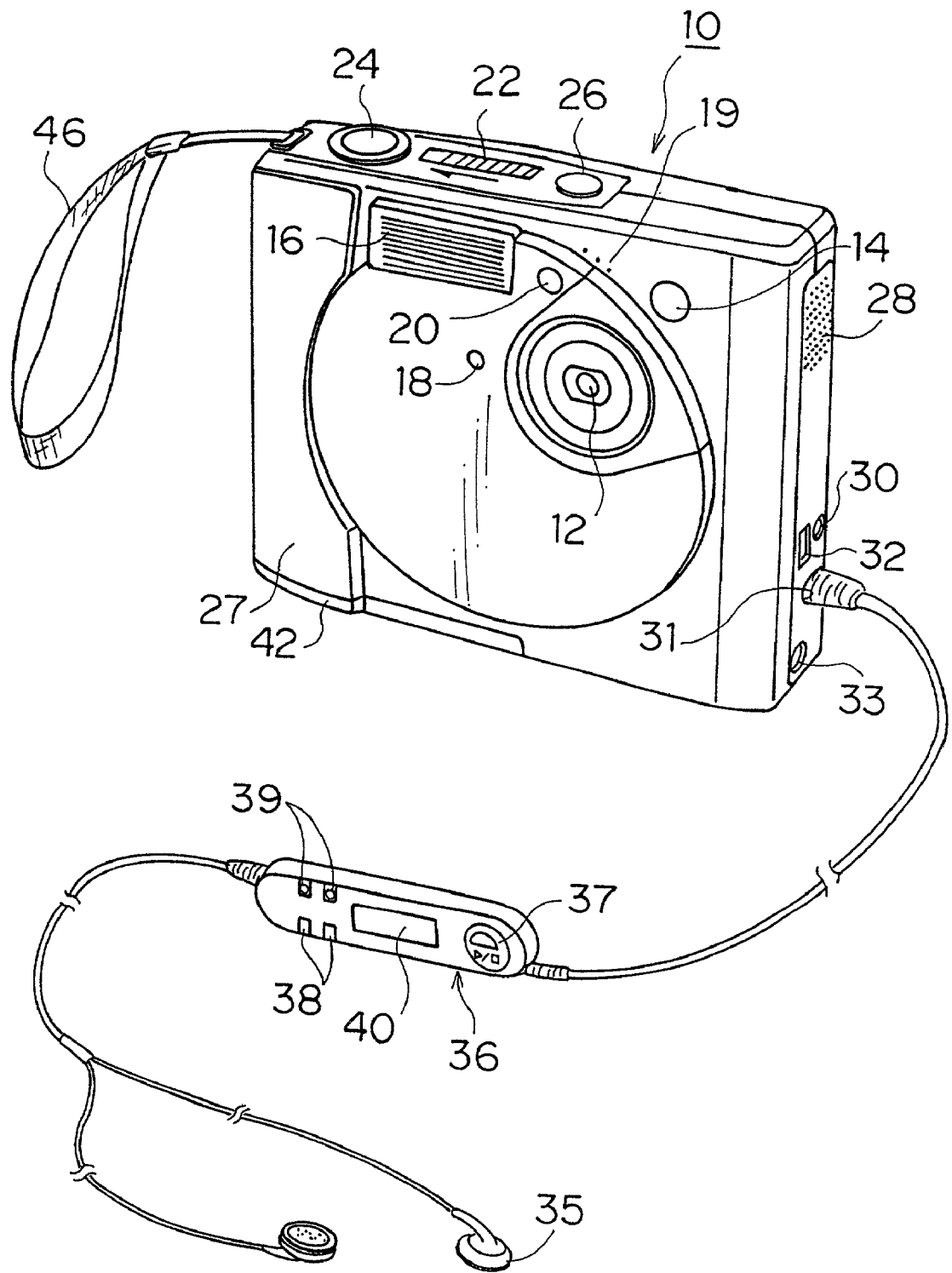
FIG. 1 is a perspective view of an appearance of a digital camera according to an embodiment of the present invention.

FIG. 1 is a perspective view of an appearance of a digital camera according to an embodiment of the invention. As shown in FIG. 1, a taking lens 12, a finder window 14, an electric flash portion 16, an electric flash dimmer sensor 18, a microphone 19 and a self-timer lamp 20 are provided on a front face of the camera 10, and a CCD image sensor (not shown in FIG. 1, denoted with numeral 68 in FIG. 3) is disposed behind the taking lens 12.

On an upper face of the camera, a power switch 22, a shutter button 24 and an electric flash button 26 for switching the electric flash image-capturing mode are disposed. On a side face of the camera opposite a grip portion 27, a speaker 28, an audio/video output terminal 30, a remote control terminal 31 including an audio output terminal, a digital (USB) terminal 32 and a power input terminal 33 are provided.

The power switch 22 also plays a role of a mode setting switch, and is constituted of a slide switch that is locked when a lug is moved to the right side (audio mode position) in FIG. 1, and is unlocked when moved to the left side. A "camera mode" and an "OFF mode" in which a camera power source is turned off is alternately set every time the lug is moved to the left side.

In the case where an "audio mode" is set by the power switch 22, various sorts of switches on a camera main body do not function, and an instruction signal from a remote controller 36 with a headphone (earphones) 35 connected to the remote control terminal 31 is only accepted. Also, in the case where the remote controller 36 is not connected to the remote control terminal 31 in the audio mode that is selected by the power switch 22, the camera power source is kept in an off state. And if the switch portions 37, 38 and 39 for the remote controller 36 are manipulated after the remote controller 36 is connected to the remote control terminal 31, the camera power source is turned on. Reference numeral 37 denotes a reproduction/stop button, 38 denotes a feed/return button, 39 denotes a volume adjustment button and 40 denotes an LCD panel.

The shutter button 24 is configured at two stages, in which an automatic focusing (AF) and an automatic exposure control (AE) are activated and locked in a "half depress" state where the shutter button 24 is lightly pressed and kept, and image-capturing is performed in a "full depress" state where the shutter button is further pressed from the "half depress" state. The shutter button 24 is a device for instructing the start of recording still picture, and is also utilized as a picture recording button (picture recording start/stop button) of the moving picture.

On the bottom of the camera, a battery cover 42 that is also utilized as a slot cover for the memory card (not shown in FIG. 1, indicated at number 94 in FIG. 3), and the card slot (not shown) and a battery compartment are formed rear the battery cover 42. Reference numeral 46 denotes a hand strap.

Figure 2:
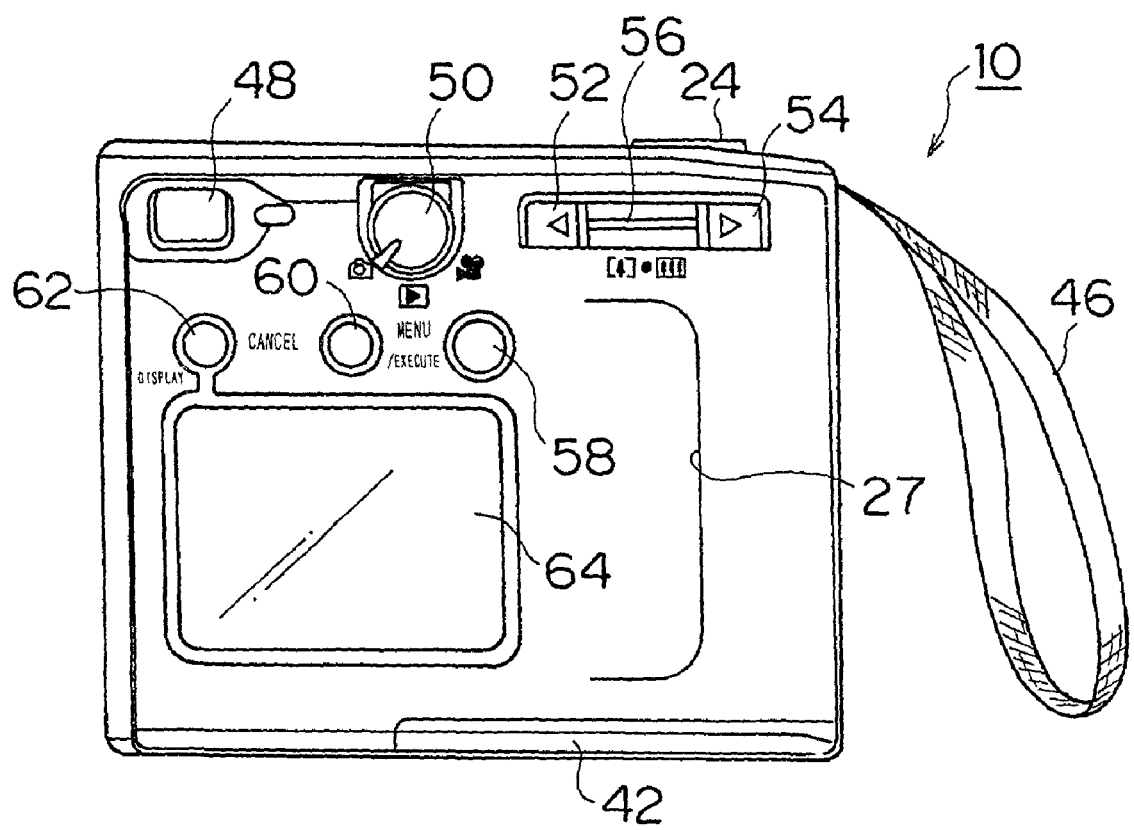
FIG. 2 is a rear view of the digital camera as shown in FIG. 1.

FIG. 2 is a rear view of the camera 10. On the rear face of the camera 10, a finder 48, a mode dial 50, a left key 52, a right key 54 and an upper/lower lever 56, a menu/execution key 58, a cancel/return key 60, a display key 62 and an LCD monitor 64 are provided. The mode dial 50 is a device for changing the function (mode) of the camera, and can be rotated to set up a still image image-capturing mode, a reproduction mode for reproducing a captured image, or a movie mode for image-capturing a moving picture.

The left key 52, the right key 54 and the upper/lower lever 56 are an operation section for inputting an instruction of instructing a corresponding one of four directions (left, right, upper, and lower), in which the left key 52 and the right key 54 function as one frame reverse feed button and one frame forward feed button in a reproduction mode, respectively, and the upper/lower lever 56 is used as a zoom lever for adjusting the magnification in a reproduction zoom function or an electronic zoom function when image-capturing.

Also, the left key 52, the right key 54 and the upper/lower lever 56 function as an operation button for selecting a menu item from a menu screen displayed by depressing the menu/execution key 58, or instructing a selected one of various set items in each menu. The menu/execution key 58 is used at the time of transiting from a normal screen of each mode to the menu screen, or at the time of instructing a determination of selected content or execution (confirmation) of processing. The cancel/return key 60 is used at the time of canceling a selected item from the menu or returning to one previous operation state. The display key 62 is a operation device for turning on/off the LCD monitor 64 or switching the reproduction method or the display or non-display of a frame number being reproduced.

The LCD monitor 64 can be employed as an electronic finder for confirming the angle of view when image-capturing, and can display a preview screen of a captured image or a reproduced image read from the memory card 94 loaded into the camera 10. Also, the display screen of the LCD monitor 64 can be utilized to select a menu item using the left key 52, the right key 54 and the upper/lower lever 56 or set any one of various setting items in each menu. Further, the LCD monitor 64 displays the number of photographable frames (photographable time for the moving picture), the reproduced frame number, presence or absence electric flash, micromode indication, recording quality, and the number of pixels.

Figure 3:
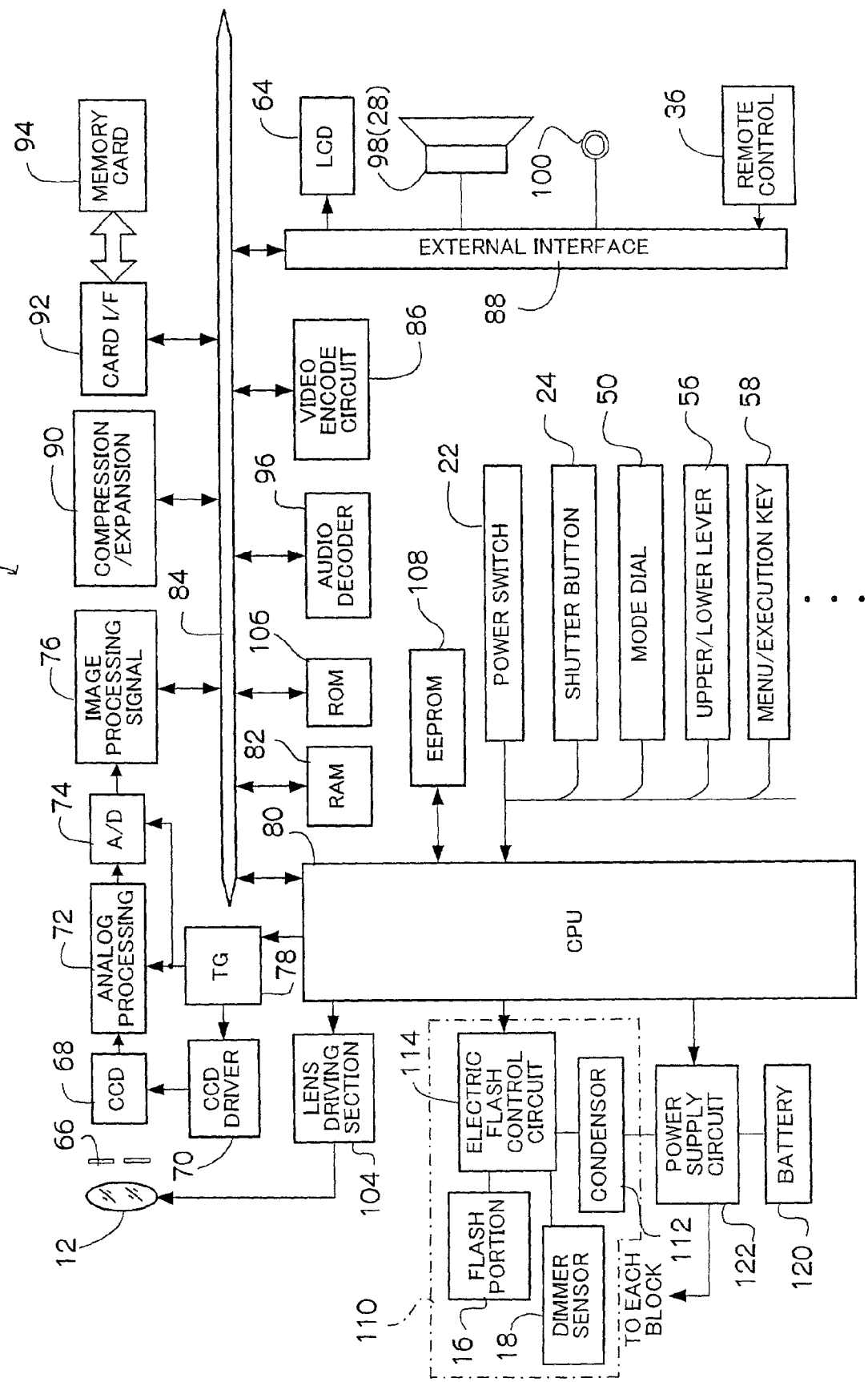
FIG. 3 is a block diagram showing an internal configuration of the digital camera according to this embodiment.

FIG. 3 is a block diagram showing an internal configuration of the camera 10. The taking lens 12 is constituted of one or mote lenses, and may be a single focal point lens or a zoom lens having variable focal length. A light passing through the taking lens 12 has the light quantity adjusted by an iris diaphragm 66 to be incident on a CCD image sensor (hereinafter referred to as a CCD) 68. The photosensors are arranged in a plane form on a light receiving plane, in which a subject image formed via the taking lens 12 on the light receiving plane of the CCD 68 is converted into signal charges corresponding to an amount of incident light by each photosensor. The CCD 68 has a so-called electronic shutter function of controlling the charge accumulation time of each photosensor (i.e., shutter speed) at a timing of shutter gate pulse.

The signal charges accumulated in each photosensor are read successively as a voltage signal (image signal) corresponding to the signal charges in accordance with a pulse given from a CCD driver 70. An image signal output from the CCD 68 is fed to an analog processing section 72. The analog processing section 72 comprises signal processing circuits such as a sampling hold circuit, a color separation circuit, and a gain adjustment circuit, and makes a correlation double sampling (CDS) processing and a color separation processing into R, G and B color signals for the image signal to adjust the signal level of each color signal (pre-white-balance processing).

A signal output from the analog processing section 72 is converted in a digital signal by an A/D converter 74, and passed to an image signal processing circuit 76. A timing generator (TG) 78 supplies a timing signal to the CCD driver 70, the analog processing section 72 and the A/D converter 74 in accordance with an instruction of a CPU 80, in which the timing signal serves to synchronize each circuit.

The image signal processing circuit 76 is an image processing device constituted of a digital signal processor (DSP) comprising a brightness/color difference signal generating circuit, a gamma correction circuit, a sharpness correction circuit, a contrast correction circuit, a white balance correction circuit, and processes an image signal in accordance with a command from the CPU 80. The image data input into the image signal processing circuit 76 is converted into a brightness signal (Y signal) and a color difference signal (Cr and Cb signals), which are then subjected to a predetermined processing such as a gamma correction and stored in a RAM 82.

When a captured image is displayed, the image data is read from the RAM 82, and transferred via a bus 84 to a video encode circuit 86. The data sent to the video encode circuit 86 is converted into a display signal of predetermined format (e.g., an NTSC color composite video signal), and then output via an external interface 88 to the LCD monitor (LCD) 64. In this way, the image contents of the image data are displayed on a screen of the LCD monitor 64.

The image data within the RAM 82 is rewritten periodically by an image signal output from the CCD 68, and a video signal produced from that image data is supplied to the LCD monitor 64, so that an image entered via the CCD 68 is displayed in real time on the LCD monitor 64. The photographer can confirm an image-capturing angle of view by seeing an image (through image) on the LCD monitor 64 or through the finder 64.

An image-capturing mode is set by operating the mode dial 50, and if the shutter button 24 is depressed, an image-capturing start instruction (release ON) signal is issued. The CPU 80 starts to take in the image data for recording in response to accepting this instruction signal. Also, the CPU 80 sends a command to a compression/expansion circuit 90, which thereby compresses the image data on the RAM 82 in accordance with a JPEG or other predetermined format.

The compressed image data is recorded via a card interface 92 in a memory card 94. The camera 10 in this embodiment employs the smart media (Solid-State Floppy Disk Card), for example, as a device which stores the image data. The form of the recording medium is not limited to the smart media, but may be a PC card, a compact flash, a magnetic disk, an optical disk, an optical magnetic disk, or a memory stick, in which various kinds of media read and written electronically, magnetically or optically, or in combination thereof, can be employed. A signal processing device and an interface conformable to the used medium are applied. A plurality of media of different or same kinds may be mounted. Also, a device which stores the image file is not limited to the removable media that can be detachably mounted on the camera main body, but may be a recording medium (internal memory) contained in the camera 10.

When a movie mode is set by the mode dial 50, the recording of a moving picture is enabled, in which a picture recording operation is started by depressing the shutter button 24, and stopped if the shutter button is depressed again. The picture recording operation may be performed while the shutter button 24 is being depressed, and stopped by not depressing. The longest recording time for each image-capturing, image size, frame rate and recording method are predetermined. For example, a movie with sound as long as about 80 seconds at maximum can be taken by one image-capturing, and is recorded at 10 frames/sec in a Motion JPEG format in the memory card 94.

If a reproduction mode is set by the mode dial 50, an image file is read from the memory card 94. The read image data is expanded by the compression/expansion circuit 90, and output via the video encode circuit 86 to the LCD monitor 64.

An audio reproduction function will be now described. The audio reproduction function of the camera 10 is usable to reproduce a music file in MP3 format that is recorded in the memory card 94. An audio mode is set by the power switch 22, and if the remote control 36 with head phone 35 is connected to the remote control terminal 31, the camera power is tuned on to enable the audio reproduction. In the audio mode, the CPU 80 only accepts a remote control signal from the remote control 36, and a switch input other than the power switch 22 is disabled from the operation section of the camera main body.

If the reproduction button 37 of the remote control 36 is depressed in a state where the camera 10 is set at the audio mode, a music file is read via the card interface 92 from the memory card 94. The music file is downloaded directly from a personal computer or a music distribution terminal, or via a digital (USB) terminal 32 into the memory card 94.

The compressed data of the music file read from the memory card 94 is expanded into uncompressed music data by the compression/expansion circuit 90. This expanded music data is converted into an audio signal by an audio decoder circuit 96, and output as audio via an external interface 88 to a speaker 98 (corresponding to numeral 28 in FIG. 1) or a head phone 35 or other audio output device connected to an audio output terminal 100.

The CPU 80 is a control section for generally controlling this camera system. The CPU 80 controls the operation of corresponding circuit in accordance with an input signal accepted from the power switch 22, the shutter button 24 or other operation section, that is, makes the display control of the LCD monitor 64, electric flash control, auto-focus (AF) control and automatic exposure (AE) control. The CPU 80 performs various arithmetical operations, including a focal point evaluation operation and an AE operation, on the basis of the image data input via the CCD 68, and controls a lens driving section 104 on the basis of its arithmetical operation result to move the taking lens 12 to a focusing position, while controlling an iris driving section, not shown, to set the iris diaphragm 66 at a correct iris diaphragm value, as well as controlling the charge accumulated time of the CCD 68.

The ROM 106 stores the programs performed by the CPU 80 and various kinds of data required for the control, and the RAM 82 has an image processing area and a working area for various operations made by the CPU 80. An EEPROM (non-volatile memory) 108 stores various kinds of setting information.

An electric flash device 110 is constituted of an electric flash portion 16, an electric flash dimmer sensor 18, a condenser 112 and an electric flash control circuit 114. By operating the electric flash button 26 as shown in FIG. 1, various modes can be set up, including a "automatic flash mode of low luminance" for flashing automatically the electric flash at low luminance, a "pink-eye reduction mode", a "forced flash mode" for flashing the electric flash without regard to subject luminance, and a "flash inhibit mode" for inhibiting the electric flash.

The CPU 80 issues a command to an electric flash control circuit 114 in accordance with an electric flash mode selected by the operator, when a picture is taken. The electric flash control circuit 114 controls the charging of the condenser 112 or a discharge (flash) timing into the electric flash portion 16 (e.g., a xenon tube) in accordance with a command applied from the CPU 80.

The electric flash dimmer sensor 18 employs a light receiving element for receiving a reflected light from the subject illuminated by the electric flash and converting it into an electrical signal according to the amount of received light. A detection signal of the electric flash dimmer sensor 18 is integrated by an integration circuit, not shown, and the electric flash is stopped when the integral amount of received light reaches a proper amount of received light.

A power source of the camera 10 may be a battery 120 or an external power source (not shown) connected to the power input terminal 33. An electric power supplied from the battery 120 is transformed into a required voltage by a power supply circuit 122 comprising a DC/DC converter, and then supplied to each circuit block.

Figure 4:
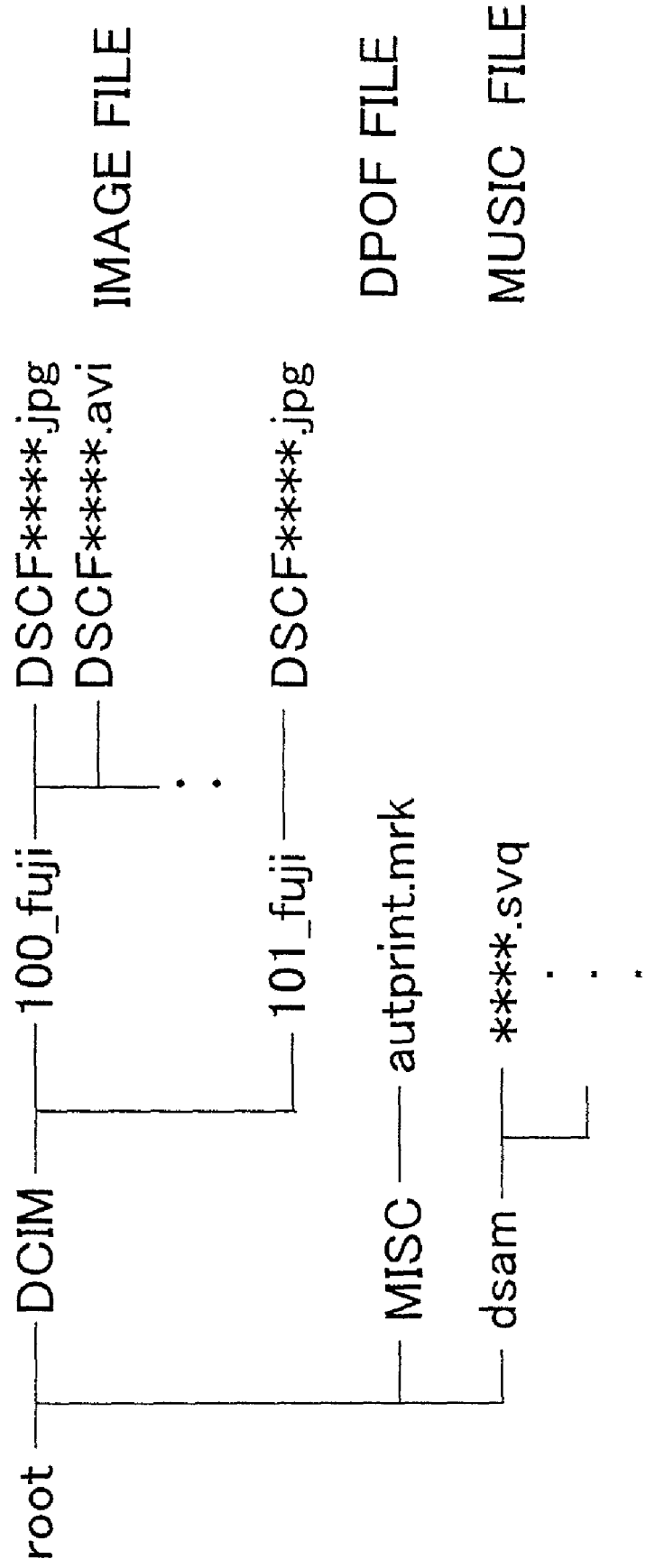
FIG. 4 is a diagram showing a directory structure of a memory card.

FIG. 4 is a diagram showing a directory structure of the memory card 94. A directory name and a file name as shown in the same figure are only one example, and may be appropriately changed. Under a root directory (root), an image file storage directory (DCIM), a DPOF file storage directory (MISC), a music file storage directory (dsam) are formed. In a lower layer of the image file storage directory (DCIM), a plurality of sub-directories "100_fuji", "101_fuji", . . . are formed, making it possible to classify and store the image file into sub-directories.

For example, a still image file stored in JPEG format by this camera 10 is recorded with a file name of "DSCF**.jpg" (where "" indicates 4-digit number), and a moving picture stored in motion JPEG format is recorded with a file name of "DSCF.avi". The file name is automatically attached by the CPU 80** when recording.

The DPOF (Digital Print Order Format) file is a print information file describing the print information to be referred to in printing the image recorded in the memory card 94, and can record, for example, the number of prints, the trimming information, and the information indicating whether the information is printed or not, in which the print information for each frame is described in text file format into the DPOF file (file name "autprint.mrk" in this embodiment).

A music file is stored in accordance with the MP3 format, and attached with a file name of "**.svq". The music file is registered by a personal computer, not shown, or downloaded by a dedicated music distribution terminal and stored in the memory card 94**. In this way, the music file is not associated with the image, and can be recorded or deleted irrespective (independent) of the image. The music file, once deleted, may be copied from the personal computer at home or downloaded from the music distribution terminal, with high possibility of reacquiring the file with the same contents. On the contrary, the image to be captured can not be taken again if a chance for image-capturing it is lost. Therefore, the image-capturing has a significant meaning for preference at the sacrifice of the music file that may be reacquired.

Figure 5:
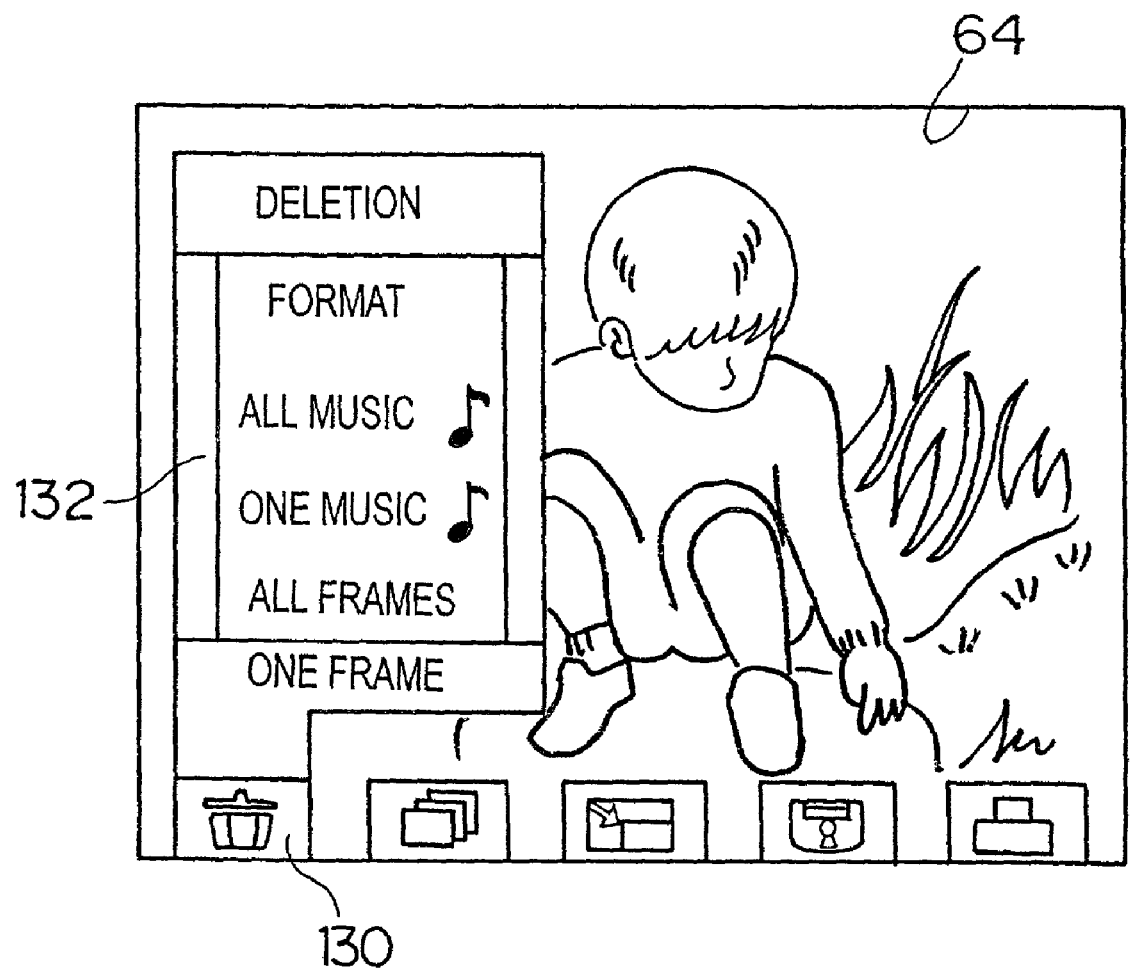
FIG. 5 is a view showing an example of a deletion menu screen.

FIG. 5 is a view showing one example of a deletion menu in the camera 10. If the menu/execution key 58 is depressed in each of the image-capturing mode, the movie mode and the reproduction mode, a menu screen corresponding to each mode is displayed. For example, if the menu/execution key 58 is depressed on one frame reproduction screen in the reproduction mode, a menu screen appears as shown in FIG. 5. The menu has five items of "deletion", "auto-play", "resize", "protect" and "DPOF", with a menu bar having icons 130 indicating these items arranged in one row under the screen of the LCD monitor 64.

If an item is selected by using the left key 52 or the right key 54, a menu balloon 132 for the sub-menu corresponding to each item is displayed. A desired content is selected from the sub-menu by using the upper/lower lever 56, and its selected content is determined by depressing the menu/execution key 58.

The "deletion" is a mode for deleting a file within the memory card 94. The "auto-play" is a mode for automatically reproducing an image file within the memory card 94 one by one in sequence. In the moving file, an image at the leading frame is reproduced as a representative image. A wipe pattern in switching the screen can be set up in the items of the "auto-play", the wipe patterns including "no wipe", "wipe 1", "wipe 2" and "wipe 3". A predetermined wipe pattern is defined for each of the wipes 1 to 3. The number of pixels can be changed to the items of "resize", including "2400×1800→1280×960", "2400×1800→640×480", or "1280×960→640×480".

The sub-menu of "protect includes three selective items of "full frame release", "full frame protect" and "one frame setting". If a desired item is selected by using the upper/lower lever 56, and the menu/execution key 58 is depressed, a confirmation screen for the protecting process execution appears, and if the menu/execution key 58 is further depressed in the confirmation screen, the protecting process is executed to provide the read-only data.

The sub-menu of "DPOF" includes the selective items of "full frame designation/release", "confirmation/release", "one frame designation" and "with date". A DPOF file is created beforehand by the digital camera 10 or the personal computer, and recorded in the memory card 94, together with the image, thereby making it unnecessary to designate the print content in making order at laboratory or printing with the printer.

The menu balloon 132 of "deletion" includes five kinds of commands of "format", "all music♪", "one music♪", "all frames", and "one frame". The "format" is a command for making optimal format in accordance with a logical format of recording media. The "all music♪" deletes all the music files that reside under the music file storage directory (dsam) as described in connection with FIG. 4. The "one music♪" deletes one piece of music from an object music file designated by the operator. The "all frames" deletes all the image frames except for the protected file (read-only file). The "one frame" deletes one frame of an image designated by the operator for the image files residing under the image file storage directory (DSIM) as described in connection with FIG. 4.

Figure 6:
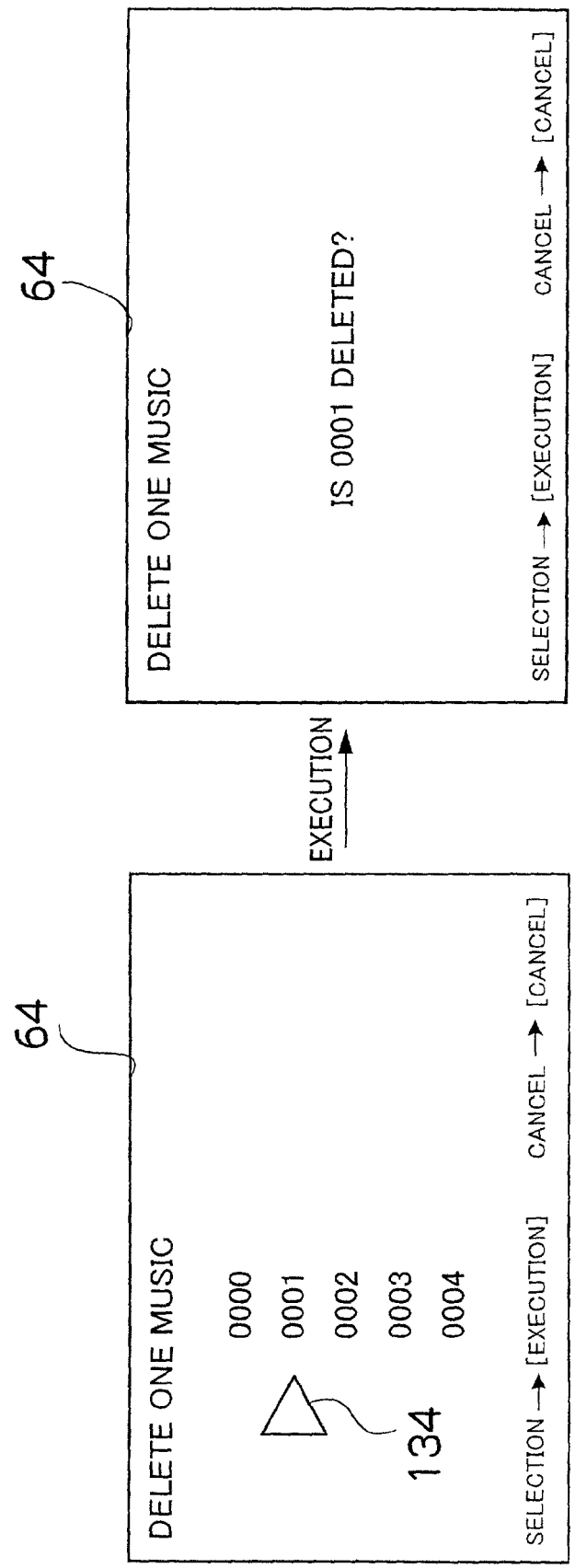
FIGS. 6(a) and 6(b) are diagrams showing an example of a display screen in deleting a music file by designating a music file for each music.

When one music from the music file is deleted in the camera mode, the file names of the music file are displayed on the screen of LCD monitor 64 (an extension may be omitted), as shown in FIG. 6(a), and an object file is selected by moving a cursor 134 by using the upper/lower lever 56.

For example, if "0001" is selected, and the menu/execution key 58 is depressed, a confirmation screen appears as shown in FIG. 6(b), in which a confirmation message "Is 0001 deleted?" and a part of the music file (e.g., a leading part of music for a fixed period of time) is reproduced. If the menu/execution key 34 is depressed in accordance with an operation guide under the screen, deletion is executed. If the cancel/return key 60 is depressed, deletion is not executed, and the operation returns to the file selection screen of FIG. 6(a).

Since the music file has a music name and a performer name, and the appendant information (data) regarding the content of the music file, the appendant information can be displayed on the screen of LCD monitor 64, instead of the file name or together with the file name. However, since the music file is downloaded from the personal computer, the file name or the music name may have its own font, and can not be displayed on the side of the camera 10, lacking the correctness.

Thus, the camera 10 according to this embodiment prompts the operator to confirm whether or not the deletion object is correct by reproducing a part of the file, when deleting the music file. Herein, the information (music number, time) for reference may be displayed on the display screen (LCD monitor 64 or LCD panel 40). The part of the file to be reproduced may be a leading part of music or jumped after a specific time by key operation. The operator inputs an instruction of executing the deletion or canceling, while listening to the music being reproduced or after reproducing the music.

Figure 7:
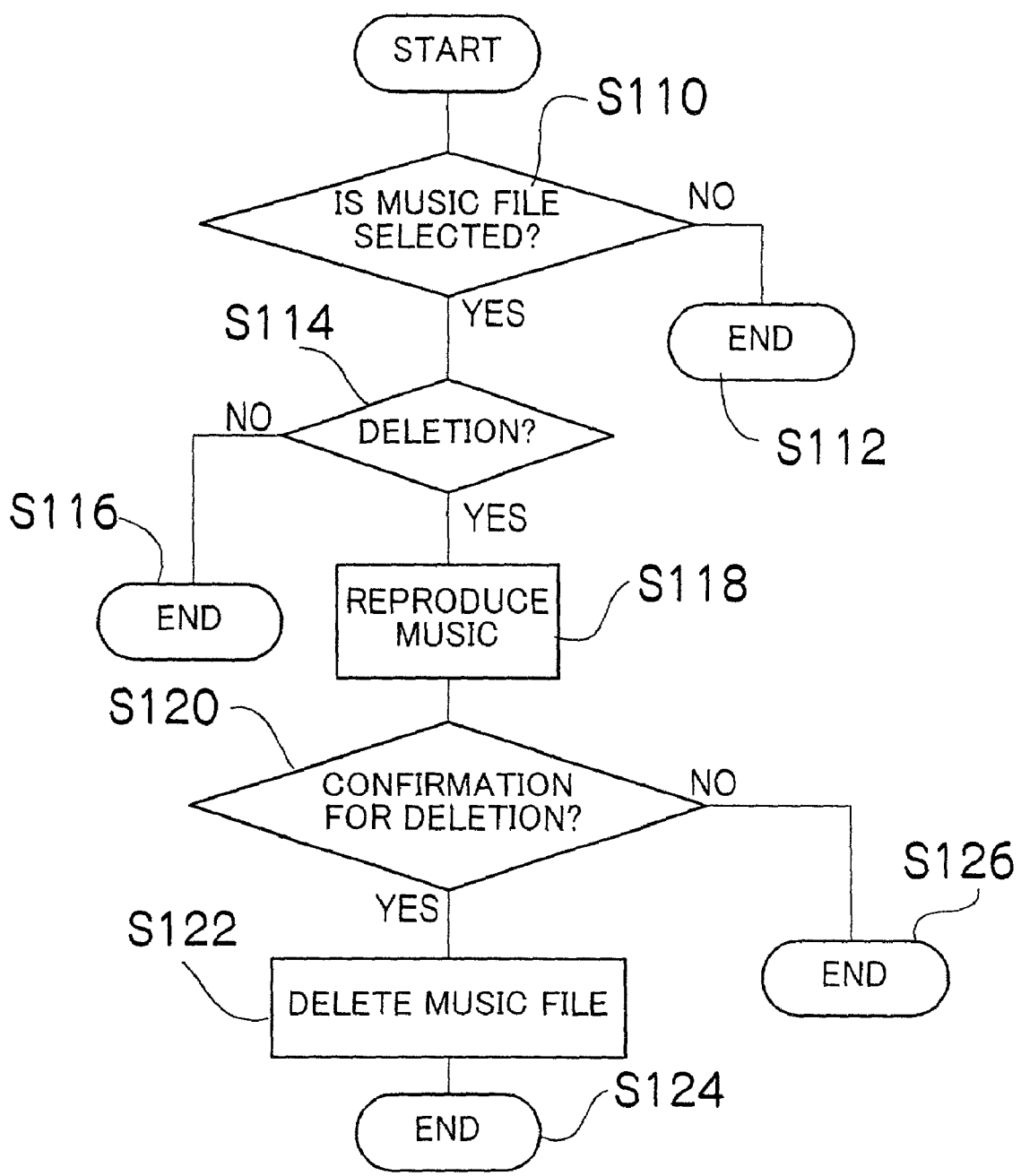
FIG. 7 is a flowchart showing a procedure for deleting the music file.

The operation of the camera 10 as constituted in the above manner will be described below. FIG. 7 is a flowchart showing a deletion procedure of the music file. When a music file is deleted from the memory card 94, the music file to be deleted is firstly selected, and it is checked whether or not the file is selected correctly (step S110).

When the selection operation is cancelled (when the file is not selected), the procedure is ended (step S112). If the music file is selected at step S110, the procedure proceeds to step S114 to determine whether or not the file is deleted. Herein, if an instruction of canceling the deletion is input, the procedure is ended (step S116). On the other hand, if an instruction of performing the deletion is input at step S114, a processing for reproducing the music of the object file is performed (step S118). For example, a beginning part of music is reproduced for a fixed period of time and automatically stopped, the procedure prompts the operator to make an instruction of reconfirming the execution of deletion. At this time, an instruction of "repeat", "still listening" or "stop reproduction" may be accepted.

After reproducing the music, it is checked whether or not a confirmation instruction for deletion execution is issued by the operator (step S120). If the confirmation instruction is input (the answer is YES), an operation of actually deleting the music file is performed (step S122), and the procedure is ended (step S124). Also, if an instruction of deletion cancel is issued at step S120, the deletion operation is not performed, and the procedure is ended (step S126).

In general, the music file for one piece of music is relatively larger in volume than the image data of one sheet, and if the music of long duration is downloaded into the memory card 94, the photographable area (image recording area) is smaller. The music file can be deleted in accordance with the procedure as shown in FIG. 7, but the memory card 94 abruptly becomes full (i.e., a state where the empty capacity of the memory card 94 is too insufficient to record the captured image), while image-capturing in the image-capturing mode, whereby if the image-capturing is further continued, the operation of deleting the music file from the deletion menu is quite troublesome.

Thus, if a card full state is detected in the image-capturing mode, and an image-capturing operation of the operation is further detected, the music file is reproduced (or the file information is displayed on the display screen), prompting the photographer (operator) to confirm whether or not the deletion is possible. The photographer, who admits that the reproduced music file may be deleted, depresses the shutter button 24 directly to instruct the execution of image-capturing. Upon this instruction, the camera 10 deletes the music file and keeps a recording area of image data to write the captured image in the memory card 94. Image-capturing operation may be detected by the photographer touching the shutter button 24 or half depressing the shutter button 24.

If the music file that the operator does not desire to delete is reproduced as the deletion object, the photographer keeps a finger away from the shutter button 24, or half depression. And if the photographer touches the shutter button 24 again, or half depresses it, the next music file is reproduced.

Also, the image-capturing operation may be performed even in the card full state, in which the image data is saved in an internal buffer (corresponding to the RAM 82 of FIG. 3) of the camera, the photographer is prompted to select any file which may be deleted by reproducing the music file, and after deleting the selected music file, the image data saved is recorded in the memory card 94. Of course, this operation control is effective only if the music file exists within the memory card 94, and if no music file exists within the memory card 94, the image-capturing operation is inhibited.

Figure 8:
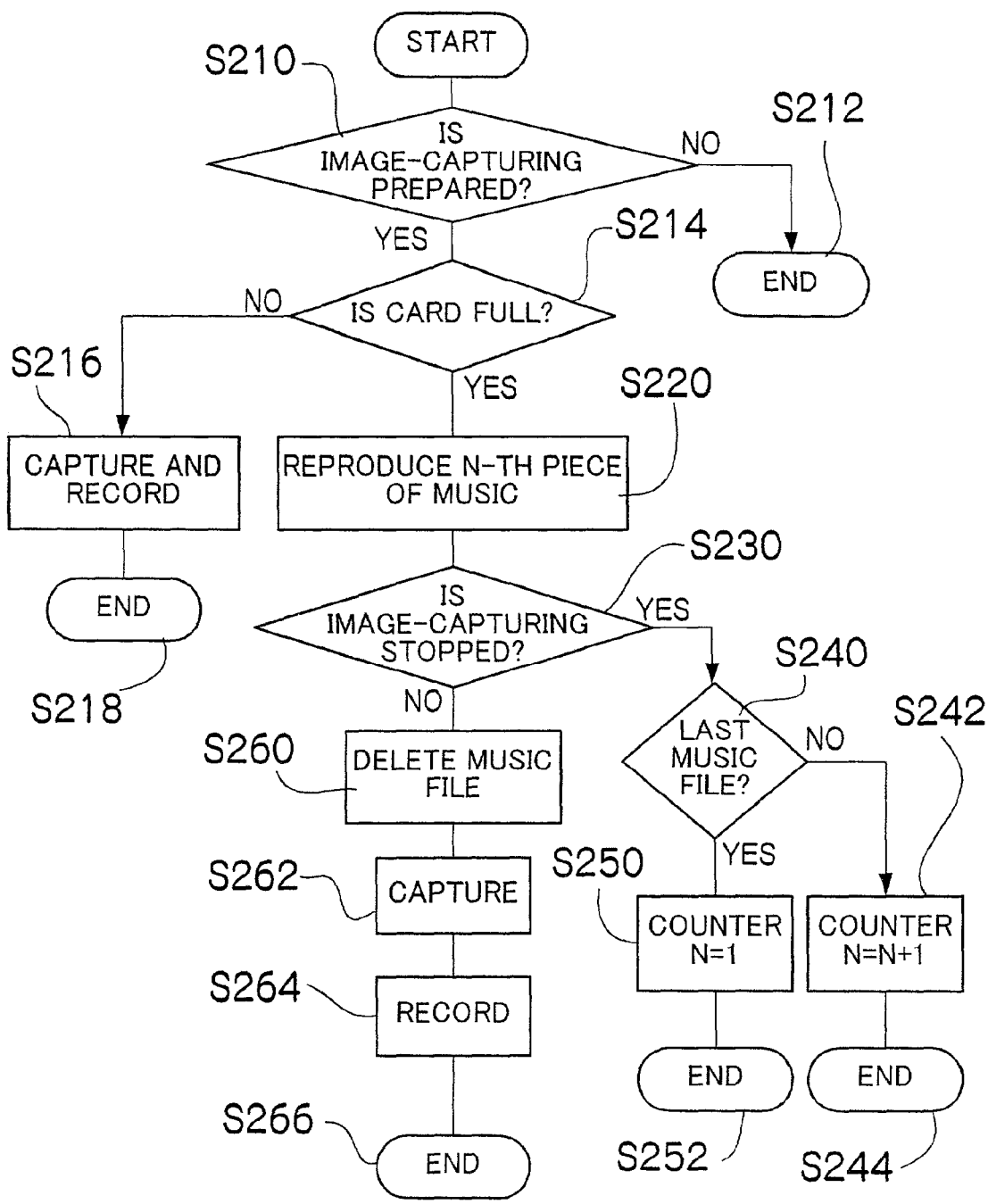
FIG. 8 is a flowchart showing a first control example for deleting the music file in an image-capturing mode.

FIG. 8 is a flowchart showing a first control example for confirming the deletion of music when the camera 10 is ready for image-capturing.

When it is detected that the shutter button 24 is half depressed or touched with a finger, an instruction of preparing for image-capturing is issued. It is checked whether or not the instruction of preparing for image-capturing is input (step S210), and if there is no instruction, the procedure is ended (step S212).

On the other hand, if an instruction of preparing for image-capturing is input at step S210, it is checked whether or not the card is full (step S214). If there is an empty area for image-capturing in the memory card 94, the procedure transfers to an image-capturing and recording step (step S216), and after the image-capturing operation and the recording operation are performed, this procedure exits (step S218).

If it is determined that the card is full at step S214, the N-th music file stored in the memory card 94 is reproduced (step S220). It is supposed that a counter N is set to an initial value of 1. This music reproduction processing (step S220) predicts the music file that is a deletion object when the image-capturing is performed, and the operator can confirm the content of the music file to be reproduced, and determine the execution or stop of image-capturing.

When the image-capturing is performed by admitting the deletion, the shutter button 24 is fully depressed. Also, when the image-capturing is stopped, the shutter button 24 is restored, or released from the finger.

After reproducing the music at step S220, the CPU 80 checks whether or not there is an instruction of stopping the image-capturing (step S230). When it is detected that the shutter button 24 is restored or the shutter button 24 is released from the finger, the "stop of image-capturing" is determined, and the procedure proceeds to step S240. At step S240, it is checked whether or not the music file reproduced at step S220 is the last music file within the memory card 94 (i.e., the N-th (N=M) file when the total number of music files is M).

If it is not the last music file (the answer is NO), the counter N is counted up by +1 (step S242), and this procedure is ended (step S244). In this case, when the operation passes through step S220 at the next time, the music file of next music is reproduced.

If it is the last music file at step S240 (the answer is YES), the counter N is reset to 1 (step S250), and this procedure is ended (step S252). In this case, when the operation passes through step S220 at the next time, the music file at the leading position (first music) is reproduced.

If an instruction of executing the image-capturing is input at step S230, the procedure proceeds to step S260 to delete the reproduced music file. Then, the image-capturing operation is performed (step S262), and a processing of recording the obtained image in the memory card 94 is performed (step S264). In this way, this procedure is ended (step S266).

Figure 9:
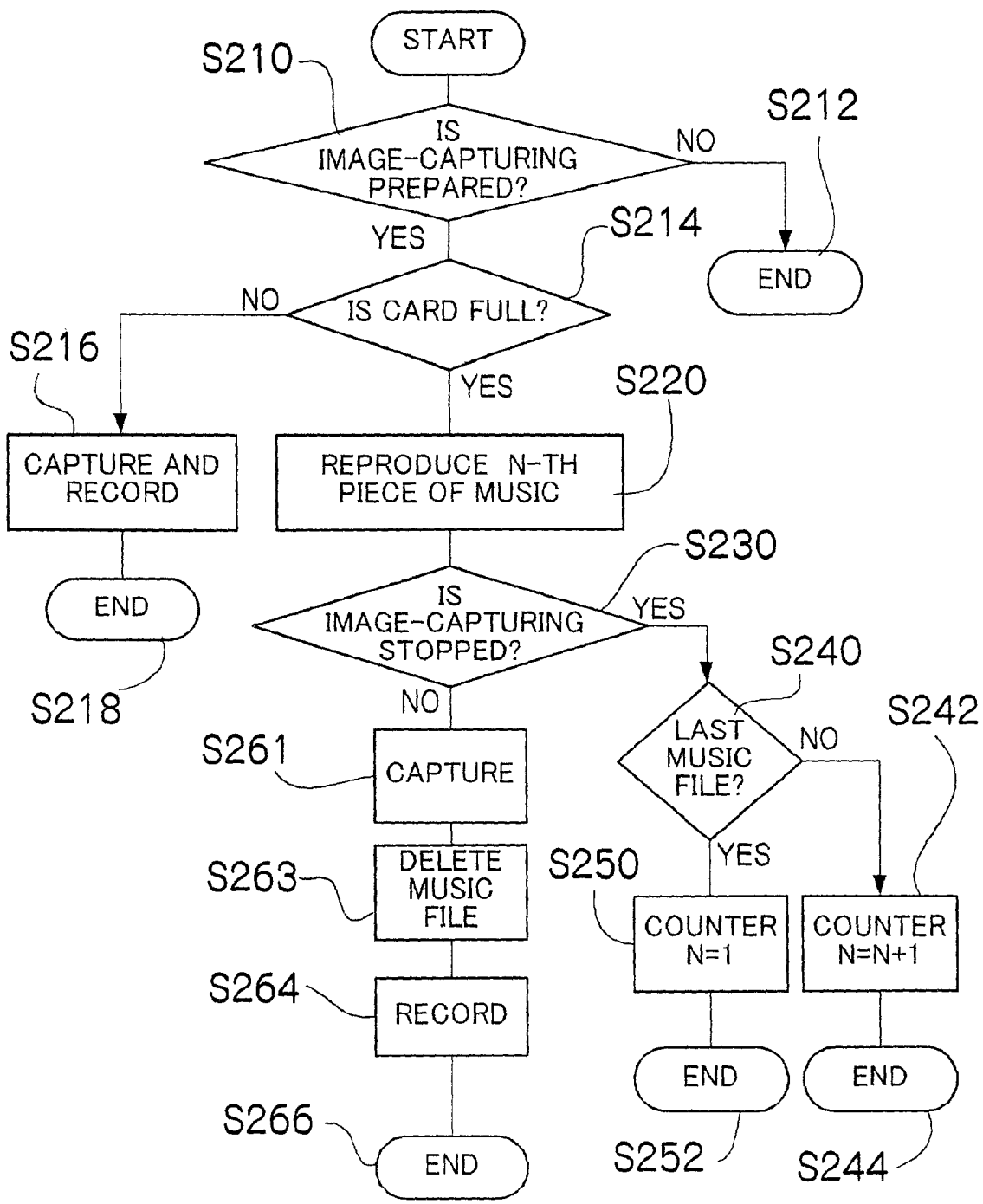
FIG. 9 is a flowchart showing a second control example for deleting the music file in the image-capturing mode.

FIG. 9 is a flowchart showing a second control example. In FIG. 9, the same steps are indicated by the same step numbers as in FIG. 8, and are not described again. Though in the flowchart of FIG. 8, the music file is deleted (step S260), and the image-capturing and recording are performed (steps S262 to S264), the image-capturing is performed ahead (step S261), the music file is deleted (step S263), and after deletion, the recording step of captured image is performed (step S264) in the flowchart of FIG. 9.

Figure 10:
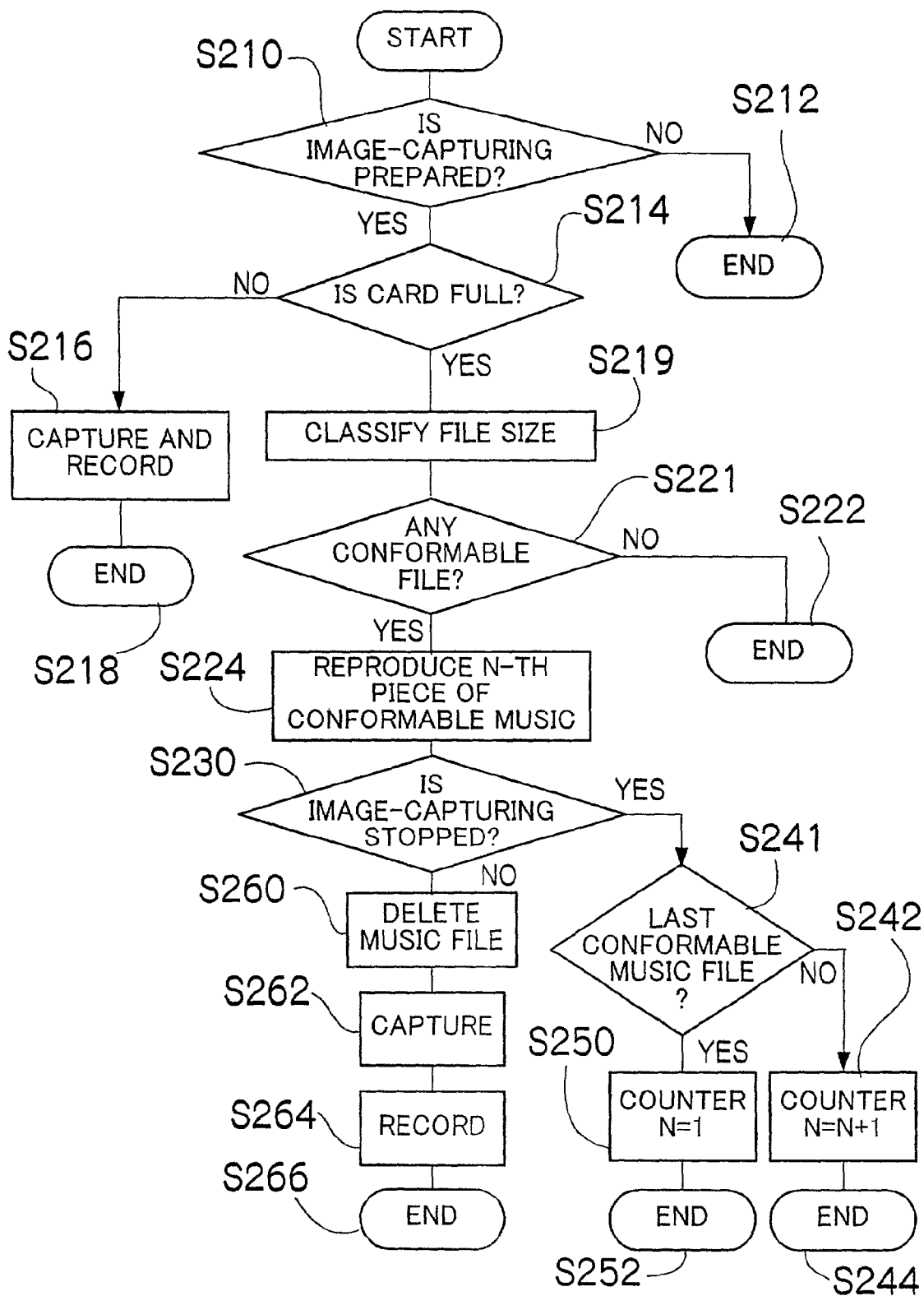
FIG. 10 is a flowchart showing a third control example for deleting the music file in the image-capturing mode.

FIG. 10 is a flowchart showing a third control example. In FIG. 10, the same steps are indicated by the same step numbers as in FIG. 8, and are not described again. FIG. 10 shows a control example of extracting a music file corresponding to an estimated capacity of recording file at the time of image-capturing, reproducing the music successively from among a group of the extracted files and presenting the music file to be deleted.

If it is determined at step S214 that the card is full, the procedure proceeds to step S219 to perform the classification of file size. This step judges the file size (estimated value of recording file size) of image defined by a combination of the number of image-capturing images and the compression ratio, and discriminates whether or not there is any music file beyond the estimated file size in the memory card 94.

It is checked whether or not the conformable music file exists within the memory card 94 on the basis of the result of the file size classification (step S221). If there is no conformable music file, the procedure is ended (step S222). On the other hand, if there is the conformable music file, the procedure proceeds to step S224.

At step S224, the N-th music file among the group of conformable files is reproduced. The initial value of N is set to 1. The consecutive number is automatically attached to the conformable file, and the music file is made the candidate for deletion in the order from the first music among the group of conformable files. The consecutive number may be attached in the order of music within the memory card 94, or in the order of music in which the file size is closer to the estimated size of image.

If the "stop of image-capturing" is determined at step S230, the procedure proceeds to step S241. At step S241, it is checked whether or not the reproduced music file is the last music file among the group of conformable files. If it is not the last music file, the counter N is set to N+1 (step S242), and the next music is made the candidate for deletion. If it is the last music file at step S241, the counter N is reset to 1 (step S250), and the leading (first) music file among the group of conformable files is made the candidate for deletion.

If the operator admits that the music file predicated as the deletion object is deleted at step S224, and instructs the execution of image-capturing operation, the music file is deleted (step S260), and the image-capturing and recording operation is performed (steps S262 to S264). The order of step S260 and step S262 may be reverse as described in connection with FIG. 9.

Figure 11:
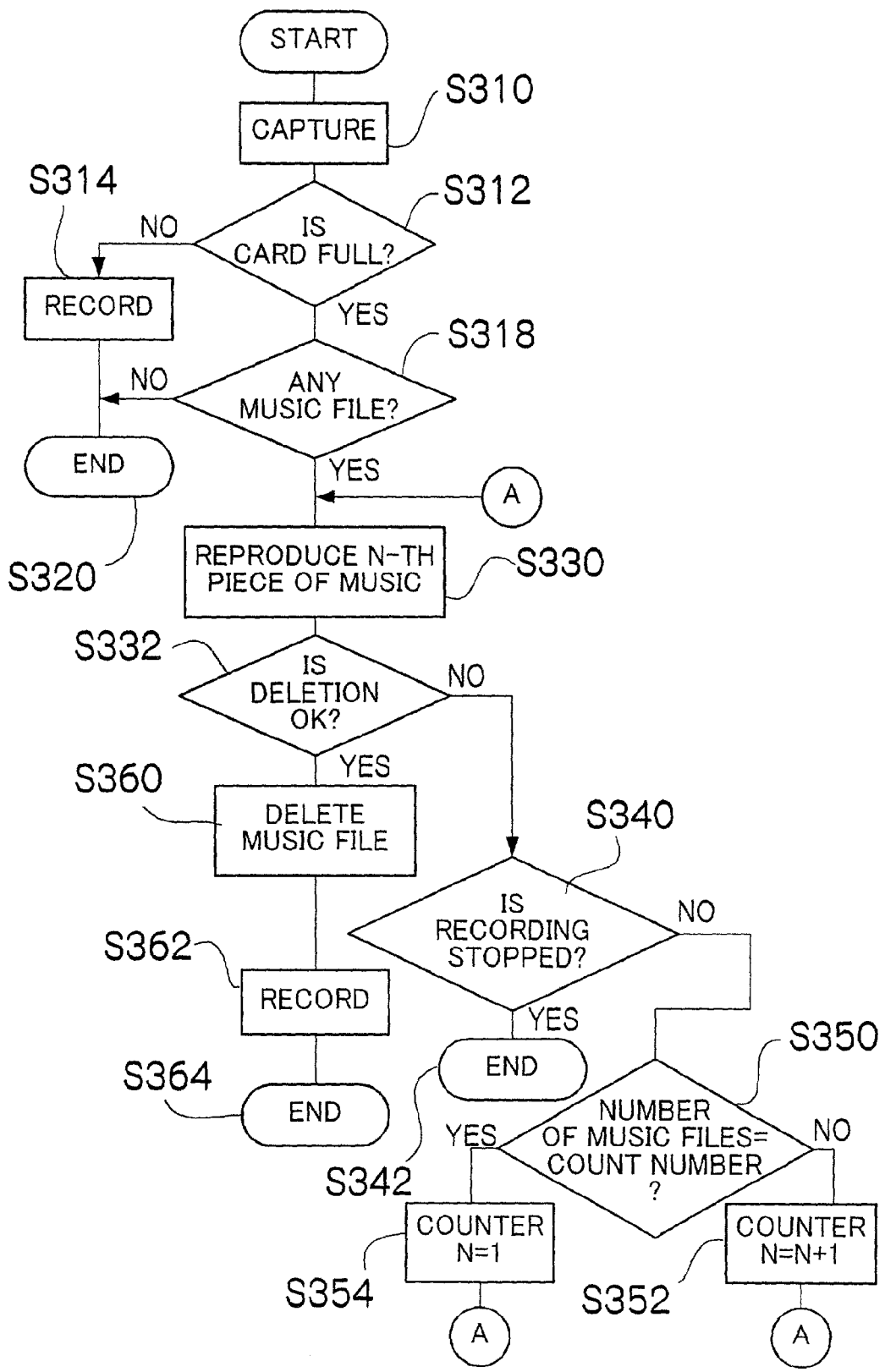
FIG. 11 is a flowchart showing a fourth control example for deleting the music file in the image-capturing mode.

FIG. 11 is a flowchart showing a fourth control example. In FIG. 11, the control example involves selectively deleting the music file after the image-capturing, and recording the captured image. First of all, the image-capturing operation is performed (step S310), and it is checked whether or not the card is full (step S312). If the card is not full, the recording operation of captured image is made (step S314), and then the procedure is ended (step S320).

If the card is full at step S312, it is checked whether or not there is any music file within the memory card 94 (step S318). If there is no music file, the recording operation is not made and the procedure is ended (step S320). On the other hand, if there is any music file within the memory card 94, the N-th music file is reproduced (step S330), and it is determined whether or not the deletion can be performed (step S332). If it is determined that the deletion is impossible (the answer is NO), it is determined whether or not the recording is stopped (step S340). If an instruction of stopping the recording of image is input (the answer is YES), the recording operation is not made and the procedure is ended (step S342).

If there is no instruction of stopping the recording at step S340 (the answer is NO), the procedure proceeds to step S350, where it is checked whether or not the number of music files and the value of counter N (counter number) are coincident. If the counter number N is not coincident with the number of music files M, the counter is counted up by +1 (N=N+1) (step S352), and the procedure returns to step S330. Thereby, the next music is predicted and reproduced as the deletion object.

If the counter number N is coincident with the number of music files M (i.e., the last music file is reproduced), the counter N is reset to 1 (step S354), and the procedure returns to step S330. In this manner, the next leading music file is predicated and reproduced as the deletion object.

If the operator admits that the reproduced music file is deleted and the answer is YES at step S332 (determination of "deletion OK"), the music file is deleted (step S360), and the recording operation of captured image is made (step S362). Then the procedure is ended (step S364).

Figure 12:
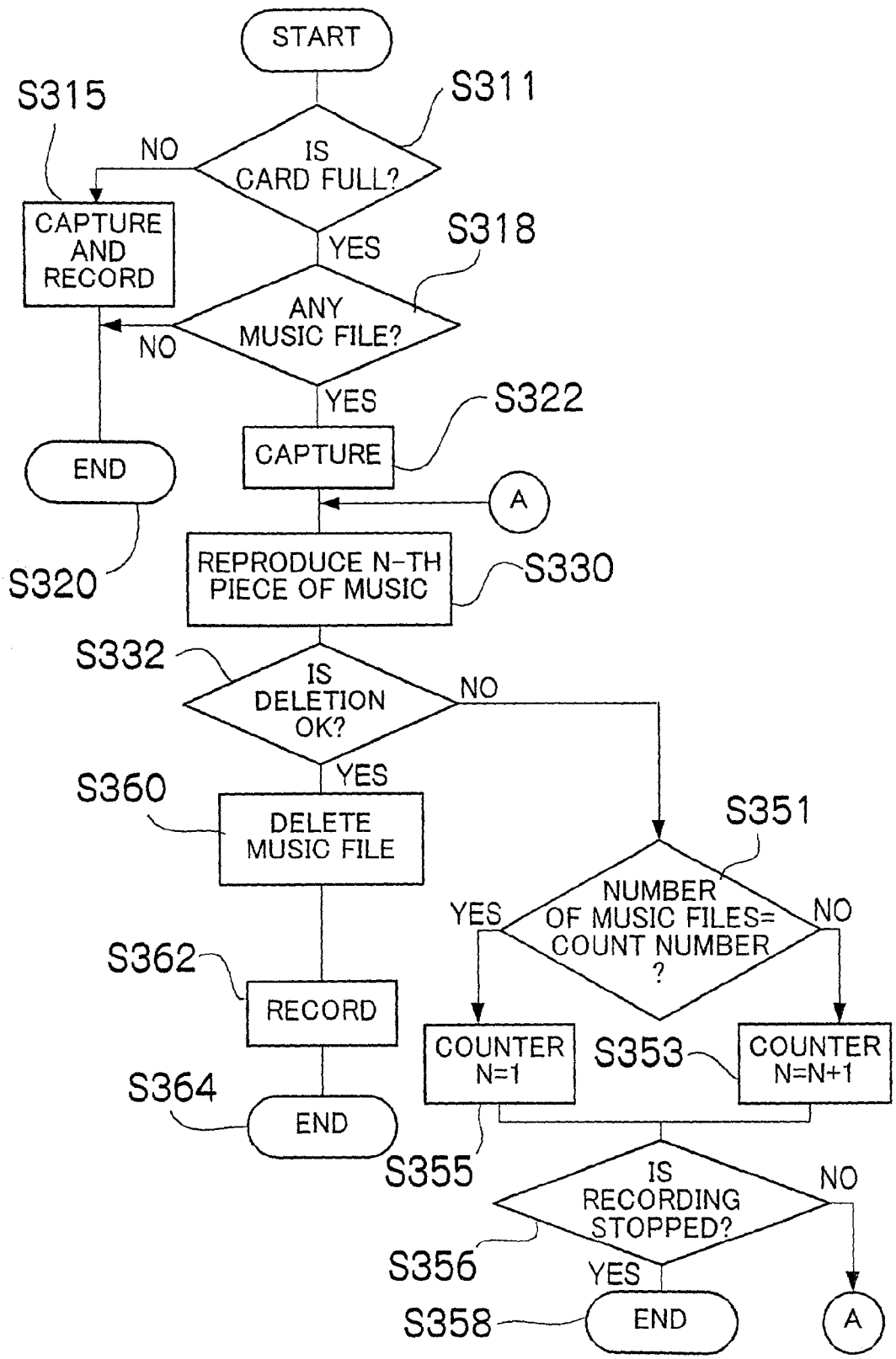
FIG. 12 is a flowchart showing a fifth control example for deleting the music file in the image-capturing mode.

FIG. 12 is a flowchart showing a fifth control example. In FIG. 12, the same steps are indicated by the same step numbers as in FIG. 11, and are not described again. In FIG. 12, first of all, it is checked whether or not the card is full (step S311), and if the card is not full, the procedure proceeds to step S315 to perform the image-capturing and recording operation.

If it is determined at step S311 that the card is full, the procedure proceeds to step S318, where it is checked whether or not there is any music file within the memory card 94. If there is no music file, the image can not be recorded in the memory card 94, and the procedure is ended (step S320). On the other hand, if there is any music file at step S318, the procedure proceeds to step S322 to perform the image-capturing operation.

Thereafter, the N-th music file is reproduced (step S330), and then it is checked whether or not deletion is allowed (step S332). If the deletion is not allowed (the answer is NO), the procedure proceeds to step S351. At step S351, it is checked whether or not the number of music files is coincident with the count number N. If the count number N is not coincident with the number of music files M, the counter is counted up by +1 (N=N+1) (step S353).

At step S351, if the count number N is coincident with the number of music files M (i.e., the last music file is reproduced), the counter N is reset to 1 (step S355). After step S353 or step S355, it is checked whether or not the recording is stopped (step S356). If an instruction of stopping the recording of image is input (the answer is YES), the recording operation is not made and the procedure is ended (step S358). On the other hand, there is no instruction of stopping the recording at step S356 (the answer is NO), the procedure returns to step S330 to change the deletion object file and reproduce the corresponding music file (reproduce the deletion object for prediction).

Figure 13:
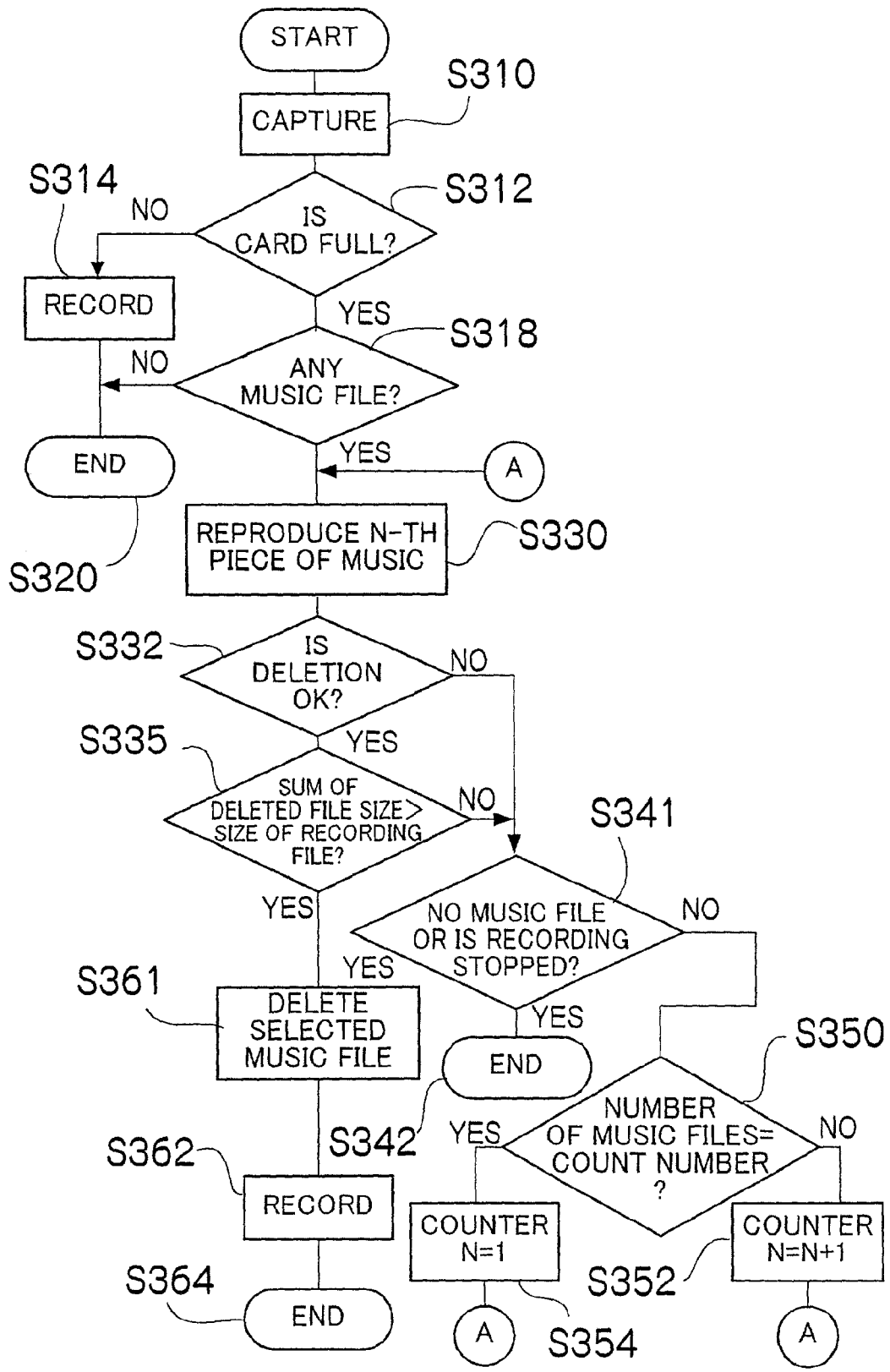
FIG. 13 is a flowchart showing a sixth control example for deleting the music file in the image-capturing mode.

FIG. 13 is a flowchart showing a sixth control example. In FIG. 13, the same steps are indicated by the same step numbers as in FIG. 11, and are not described again. In the flowchart of FIG. 13, if an instruction of performing the deletion is obtained in the determination for deletion at step S332 (the answer is YES), the procedure proceeds to step S335. At step S335, it is checked whether or not the sum of file size for the music file to be deleted is greater than the estimated file size of recording image. If the answer is YES in this check, the selected music file is deleted (step S361), and the recording operation of image is made (step S362).

If the answer is No at step S335, that is, the sum of file size for the music file to be deleted is smaller than the estimated file size of recording image, the procedure branches to step S341 to select another music file to be deleted. That is, at step S341, it is checked whether or not there is any music file to be deleted within the memory card 94 or an instruction of stopping the recording of image is input. If there is no music file to be deleted within the memory card 94 or an instruction of stopping the recording is issued, the recording operation is stopped and the procedure is ended (step S342).

At step S341, if there is any music file to be deleted within the memory card 94, and there is no instruction of stopping the recording, the procedure proceeds to step S350. And it is checked whether or not the number of music files is coincident with the count number N (step S350). If the count number N is not coincident with the number of music files M, the counter is counted up by +1 (N=N+1) (step S352), and then the procedure returns to step S330. Thereby, the next music is predicted and reproduced as the deletion object.

At step S350, if the count number N is coincident with the number of music files M (i.e., the last music file is reproduced), the counter N is reset to 1 (step S354), and then the procedure returns to step S330. In this manner, the next leading music file is predicted and reproduced.

Through the step S330 to step S354, one or more music files corresponding to the estimated file size of recording the captured image are selected as the deletion object, and if the answer is YES at step S335, the selected music file is deleted (step S361). Then the recording operation of image is made (step S362). In this manner, this procedure is ended (step S364).

In the control example of FIG. 13, all the music files to be deleted are selected and then deleted at a time, but the music file may be deleted every time it is selected.

Figure 14:
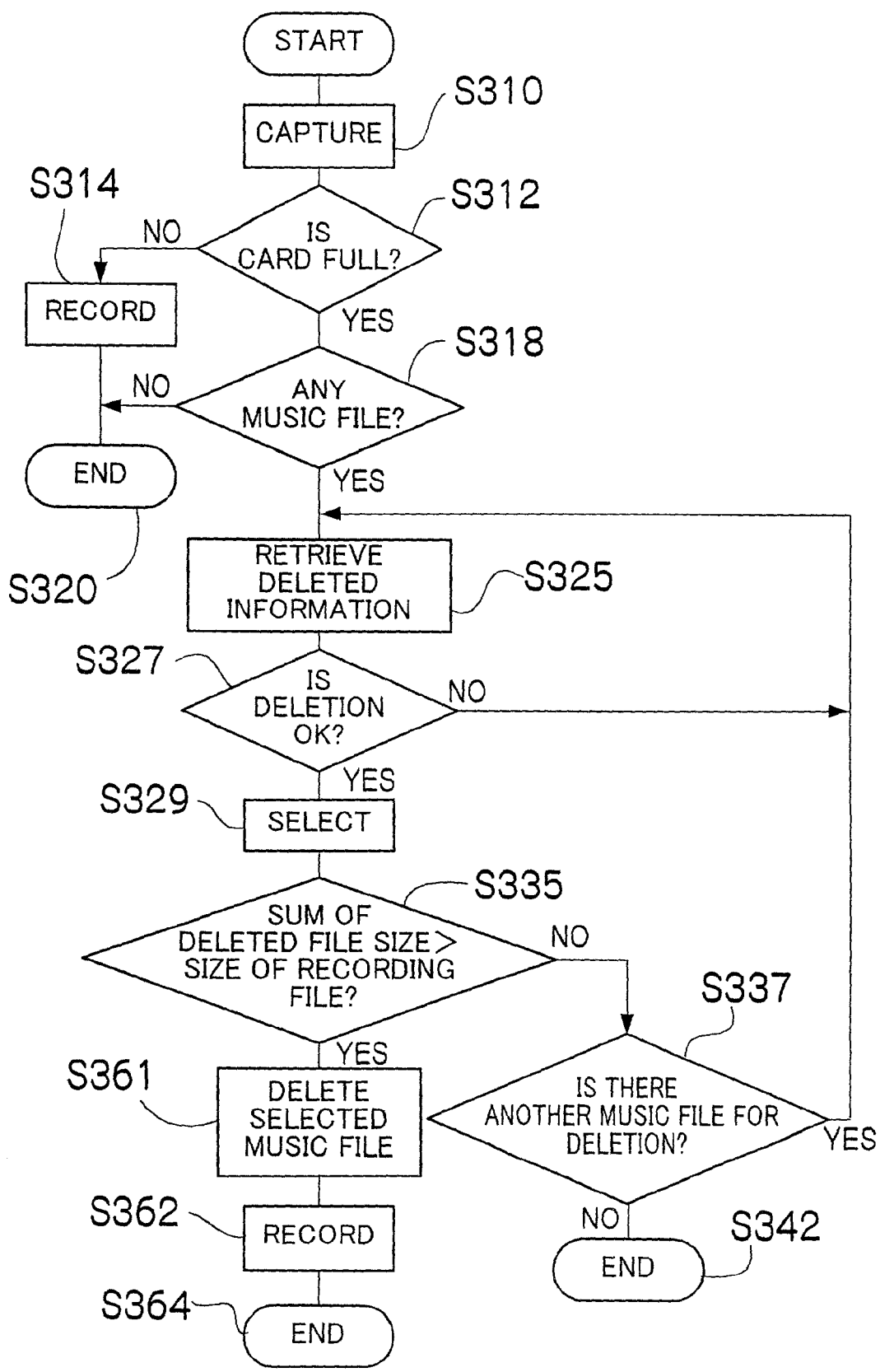
FIG. 14 is a flowchart showing a seventh control example for deleting the music file in the image-capturing mode.

FIG. 14 is a flowchart showing a seventh control example. In FIG. 14, the same steps are indicated by the same step numbers as in FIG. 13, and are not described again. In the case where the image-capturing operation is performed in card full state, the music files are deleted in a predetermined order without confirming the file content by audio or on the screen, and an empty area amounting to the file size of image data is kept and the recording of image data is made.

To make such a control, the information regarding the order of deleting the music files and whether or not the deletion of music file is allowed is stored in the memory (e.g., EEPROM 108 of FIG. 3) within the camera 10 or the external memory card 94. This deletion information is laid on the memory (memory card 94 in this example) that stores the image data and the music data, and the information content is updated every time the music data is deleted and added.

The default of deletion order is defined beforehand such as the order of downloading the music files, or its reverse order, the order in which the recording time is longer or shorter, or the order in which the file size is larger or smaller. The deletion order can be changed at will by the operator performing an operation of changing the deletion information, and whether or not the deletion is allowed can be set at will by the operator.

As shown in FIG. 14, the image-capturing operation is performed (step S310), and it is checked whether or not the card is full (step S312). If the card is full, it is checked whether or not there is any music file (step S318). And if there is no music file within the memory card 94, the recording operation is stopped (step S320). At this time, it is preferable that a warning indicating the "card full state" is issued to the operator. For the warning, a warning message may be displayed on the LCD monitor 64, or output from the speaker 28. Also, a combination of display and audio may be made.

On the other hand, if there is any music file within the memory card 94 at step S318, the deletion information is firstly retrieved (step S325), and it is checked whether or not the music file can be deleted (step S327). If a file with deletion permission set is detected, that file is selected as the deletion object file (step S329). Then, it is checked whether or not the sum of size (total size) of music file selected is greater than the predetermined size of image file (step S335).

If the sum of file size of deletion object is less than the size of image file, the procedure proceeds to step S337 to retrieve the music file that can be deleted at the next time. That is, it is checked at step S337 whether or not another music file can be deleted, and if another music file can be deleted, the procedure returns to step S325. Through the step S325 to step S335, if the total size of music file to be deleted is greater than the estimated size of image file, the selected music files are deleted (step S361), and then the image file is recorded (step S362).

If no music file can not be deleted at step S337, that is, if the total size of music file that can be deleted within the memory card 94 is less than the size of image file, the deletion of music file and the recording operation of image file are stopped, and the procedure is ended (step S342).

In the above embodiment, the present invention is applied to the digital camera, but the invention is not limited to the electronic camera for converting optical image into electrical signal employing image pick-up elements. That is, the deletion procedure of music file as shown in FIG. 7 is applicable not only to the camera but also to various kinds of devices having the function of reproducing the music by reading the information from the internal or external to recording medium, such as the personal computer, MP3 player, other music reproducing apparatus, and portable information terminal (PDA).

Figure 15:
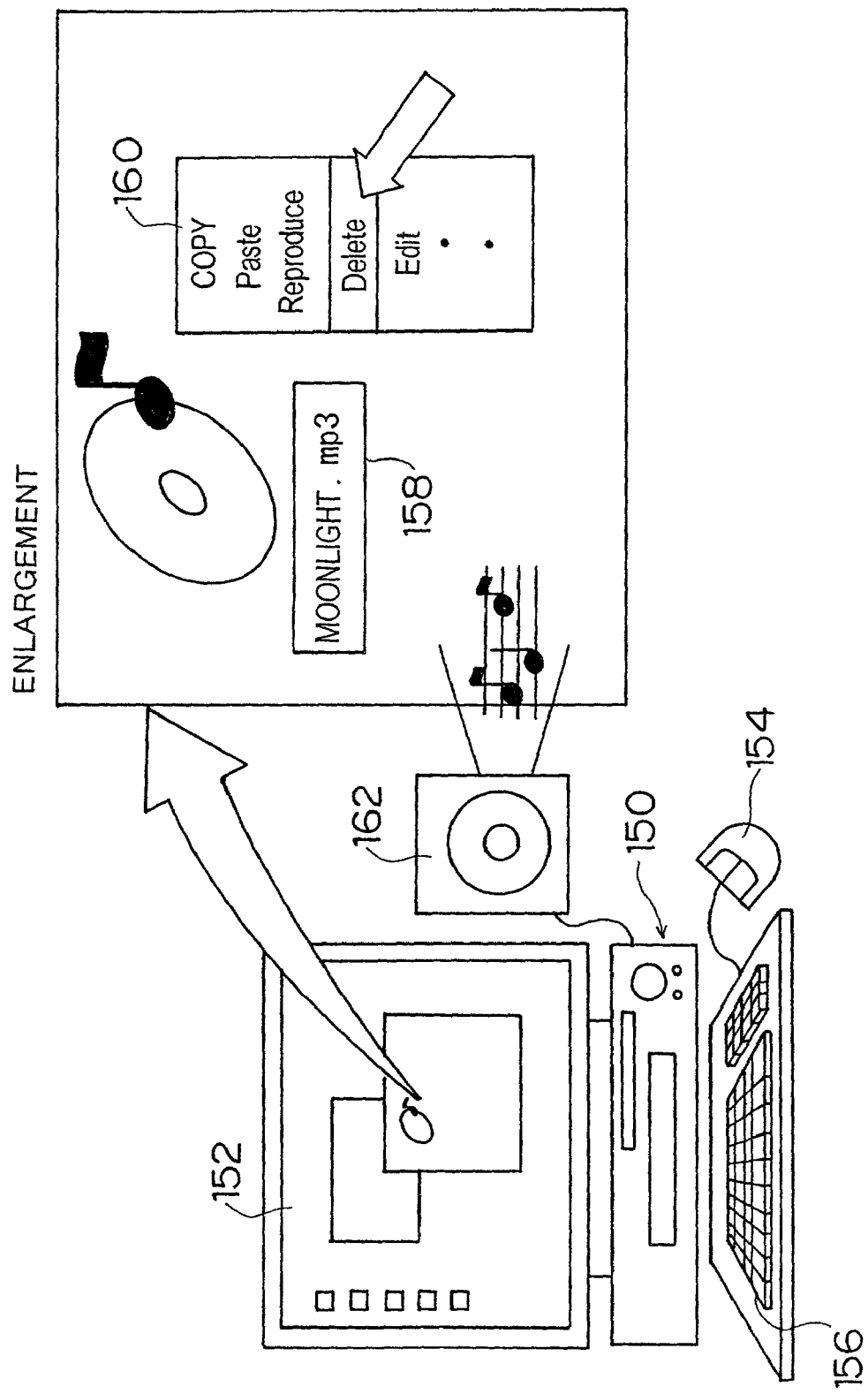
FIG. 15 is an explanatory view for explaining a computer system according to another embodiment of the invention.

For example, if a music file 158 is selected on two screens of a display (monitor) 152 for a personal computer 150, using an input device such as a mouse 154 or a keyboard 156, and the "deletion" is designated from a menu 160, a part of the music file 158 is reproduced and output from a speaker 162, as shown in FIG. 15.

When the deletion of music file is performed in accordance with a normal file operation in the personal computer 150, such that the music file is dragged and dropped into a "garbage bin", the music may be reproduced to prompt the operator to confirm the deletion of music file.

As described above, with the method, apparatus and program for deleting the audio file according to this invention, a part or all of the audio file is reproduced as an audio output for confirmation, when deleting the audio file, whereby there is less possibility that the operator may delete the unintended file by mistake.

Also, with the camera with audio reproduction function, the deletion of music file can be smoothly performed in the image-capturing mode, thereby keeping the number of photographable sheets (i.e., the recordable area of recording medium) for the image.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A camera with an audio reproduction function, comprising:
    an image pick-up device which converts an optical image into an electrical signal;
    an image-capturing instructing device which instructs the start of a picture taking operation with the image pick-up device;
    a signal processing device which processes the electrical signal obtained by the image pick-up device to convert it into the image data;
    a recording device which records the image data obtained by the signal processing device on a recording medium;
    a reproduction processing device which reproduces an audio file recorded on the recording medium;
    an audio output device which outputs the audio reproduced by the reproduction processing device audibly;
    a device which detects an empty capacity of the recording medium;
    a device which determines an estimated recording data amount of image acquired by an image-capturing operation using the image pick-up device; and
    a control device which controls selective deleting of an audio file from said recording medium, wherein, when the empty capacity of the recording medium is less than the estimated recording amount, said control device controls selective deleting by controlling said reproduction processing device to reproduce a portion of an audio file that is a candidate deletion object for output by said audio output device and deletes the candidate deletion object upon determining that an operator is proceeding with a previously-initiated picture taking operation
    wherein deletion of music is performed in an image capturing sequence; and
    wherein when the shutter is at a location half depressed, if an empty area of the recording medium is not enough, a music file that is a deletion object is reproduced, and when the shutter button is at a location fully depressed without interruption, the music file is deleted, and the image-capturing operation is performed and the captured image is recorded, and when the shutter button is restored and is not depressed after the reproduction of the music file, deletion of the music file is not performed.

* * * * *